Figure 1:
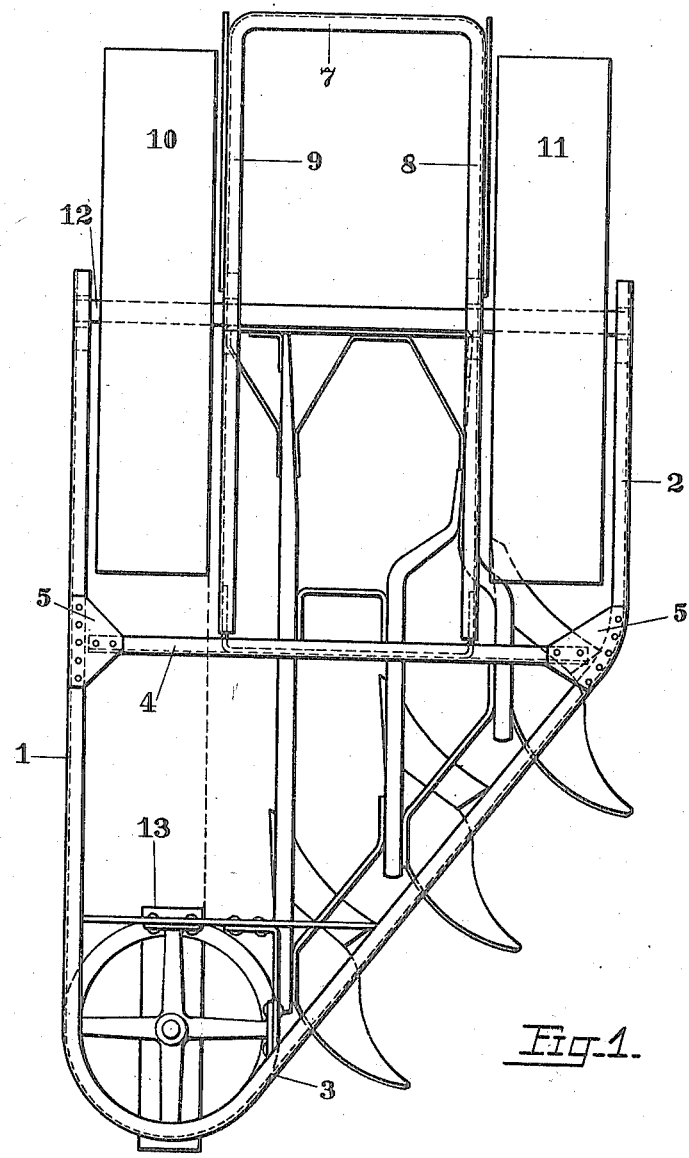

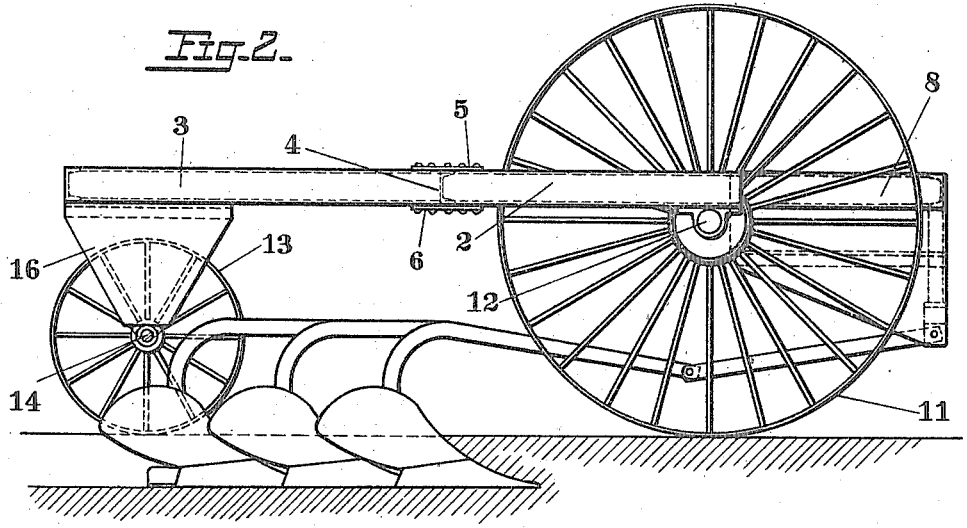
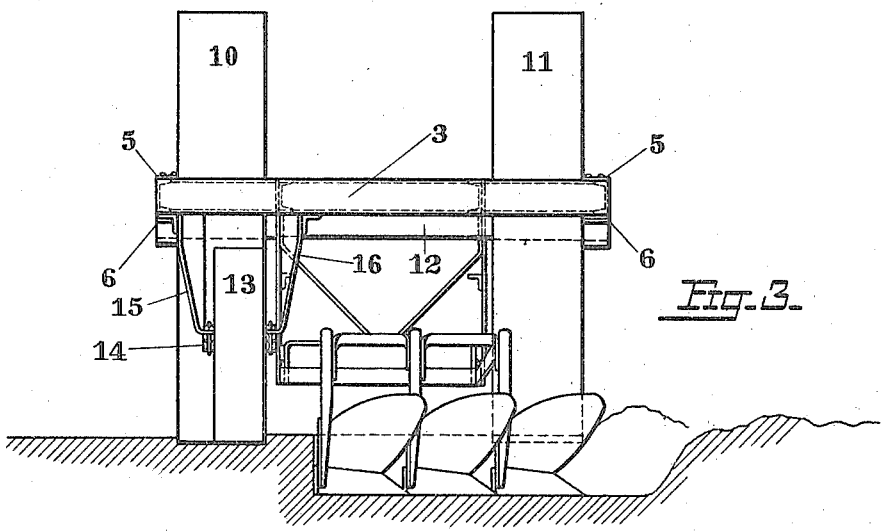

UNITED STATES PATENT OFFICE.

CHARLES H. MELVIN, OF MOLINE, ILLINOIS, ASSIGNOR TO DEERE & COMPANY, OF MOLINE, ILLINOIS, A CORPORATION OF ILLINOIS.

TRACTOR-PLOW.

1,249,447.　　　　　Specification of Letters Patent.　　Patented Dec. 11, 1917.

Application filed August 6, 1913. Serial No. 783,408.

*To all whom it may concern:*

Be it known that I, CHARLES H. MELVIN, a citizen of the United States, residing at Moline, in the county of Rock Island and State of Illinois, have invented certain new and useful Improvements in Tractor-Plows, of which the following is a specification, reference being had therein to the accompanying drawing.

My invention relates to power tractors, particularly to that class adapted for use in agricultural operations. The object of my invention being to arrange the tractor-wheels in such a manner as to secure greater efficiency in use, as will be more clearly described in the following specification.

Referring to the drawings in which similar numerals indicate identical parts—

Figure 1 is a plan view of a tractor-frame and supporting wheels. Fig. 2 is a side elevation, and Fig. 3 is a rear elevation.

The main-frame comprises parallel side-bars 1 and 2 of different lengths, and connected by a rear diagonal bar 3. A transverse bar 4 extending between the side-bars 1 and 2 is secured rigidly to the latter preferably by plates 5 and 6 riveted or bolted to the upper and lower sides respectively of the transverse bar 4 and the side-bars 1 and 2. Secured to the transverse bar 4 is a forwardly projecting supplemental frame 7, preferably U shaped, between the side-bars 8 and 9 of which, and the side-bars 1 and 2 of the main-frame, the tractor-wheels 10 and 11 are located.

The tractor-wheels 10 and 11 are journaled on a shaft 12 rigid in suitable bearings on the under side of the side-bars of the main and supplemental frames. The side-bars 1 and 2 and the diagonal bar 3 are formed preferably of a single bar; the juncture of the diagonal bar 3 and the side-bar 1 being a curve as shown, forwardly of which is located a steering and supporting wheel 13 journaled on a shaft 14 supported in bearings on depending brackets 15 and 16.

A gang of plows, in this instance consisting of three bodies, is connected forwardly to the supplemental frame 7 and arranged diagonally landward, the furrowward plow-body being directly rearward of the furrowward tractor-wheel and practically in alinement therewith.

It will be noticed that the furrowward sides of the wheels 10 and 13 are in the same longitudinal plane, and that the rear end of the landward plow body is substantially opposite the center of the wheel 13; by this construction and arrangement of parts, the unplowed soil, on which the wheels 10 and 13 travel, instead of breaking and crumbling under the pressure of the wheels 10 and 13 as under ordinary conditions, is made more solid and compact and better able to stand the pressure from the wheel 11 when the next round is made, and the landward plow is materially aided in making a clean well defined cut, the downward pressure of the wheel 13 being aided in compacting the soil by the landward pressure of the rear plow. It will be noted that in starting to open up a field the wheels 10 and 13 compress the earth a distance from the rear plow of approximately half the width of a furrow, so that in the next round of the tractor-plow, the plow immediately in the rear of the wheel 11 cuts ground which has been compressed by the wheels 10 and 13 for about one-half the width of a furrow, and part of the ground is in a normal condition, on the next or third round, and in succeeding rounds of the tractor plow however, the wheel 11 will travel over ground which has been compressed the entire width of a furrow on the previous round, and the furrowward plow cuts the soil cleanly and to much better advantage.

A still further advantage of my construction is the facility with which the plows are detachable from the tractor-frame so that they may be left in the field in the position they may be in at the termination of work, the frame rearward of the plows being entirely clear so that the tractor can be readily moved from over them. Placing the wheels 10 and 13 in line with each other makes practically a two track machine, so that it is adapted for a smooth road, or the common rural road of a ridge and two ruts. None of the wheels of the tractor, when used for plowing, move in the furrow, but all of them travel upon unplowed ground.

What I claim is—

In a tractor-plow having in combination a main-frame, landward and furrowward tractor wheels therefor, a plurality of plow-bodies connected to said tractor and arranged diagonally landward, and a steering supporting wheel on the main-frame rearward of the landward tractor-wheel and opposite the landward plow-body, said steering wheel having its furrowward side in alinement with the furrowward side of the landward tractor-wheel and approximately a half furrow distance from the landward plow-body.

In testimony whereof I affix my signature, in presence of two witnesses.

CHARLES H. MELVIN.

Witnesses:
MARTIN PETERSON,
W. G. DUFFIELD.

Copies of this patent may be obtained for five cents each, by addressing the "Commissioner of Patents, Washington, D. C."